E. M. BURR.
DYNAMOMETER.
APPLICATION FILED JAN. 23, 1920.
1,433,067.
Patented Oct. 24, 1922.
13 SHEETS—SHEET 1.
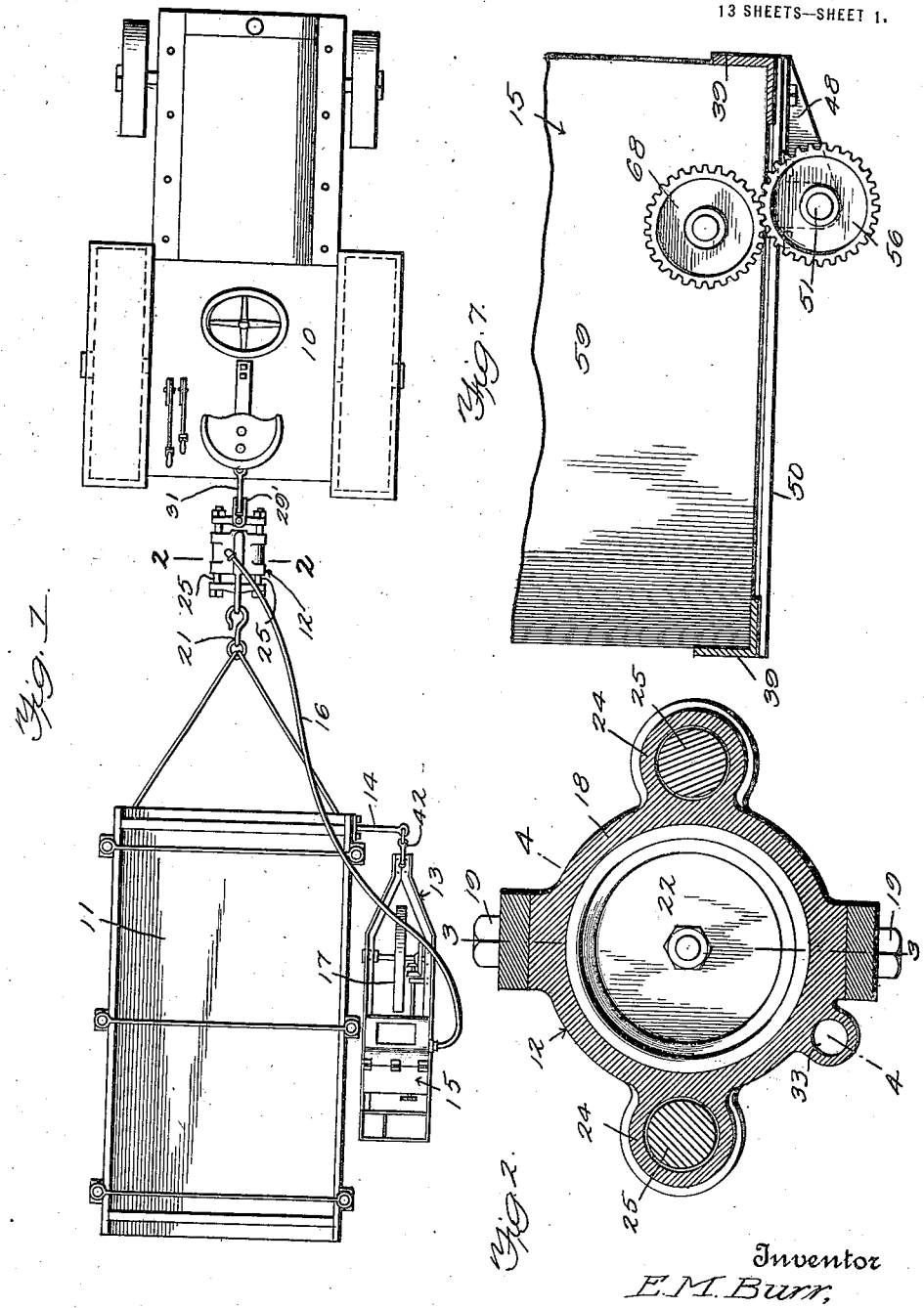
Inventor
E. M. Burr,
By
Attorney

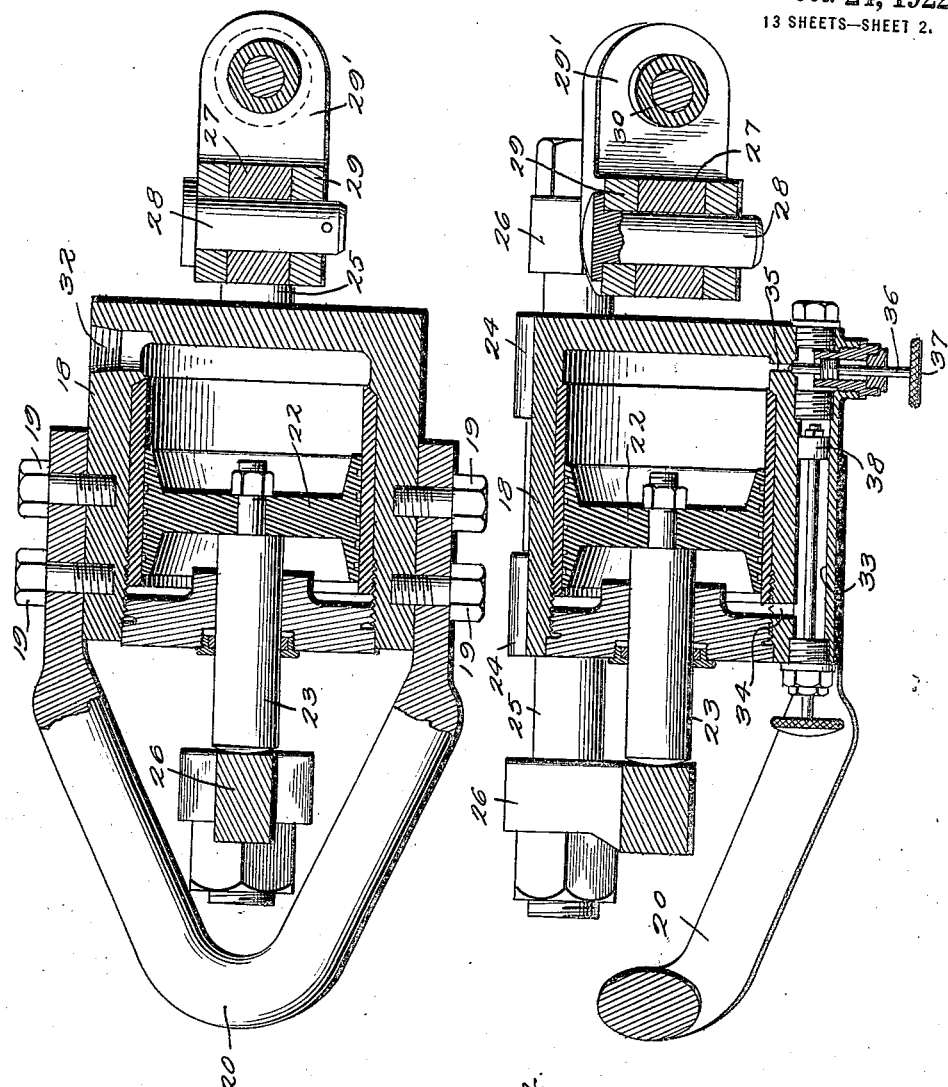

E. M. BURR.
DYNAMOMETER.
APPLICATION FILED JAN. 23, 1920.
1,433,067.
Patented Oct. 24, 1922.
13 SHEETS—SHEET 3.
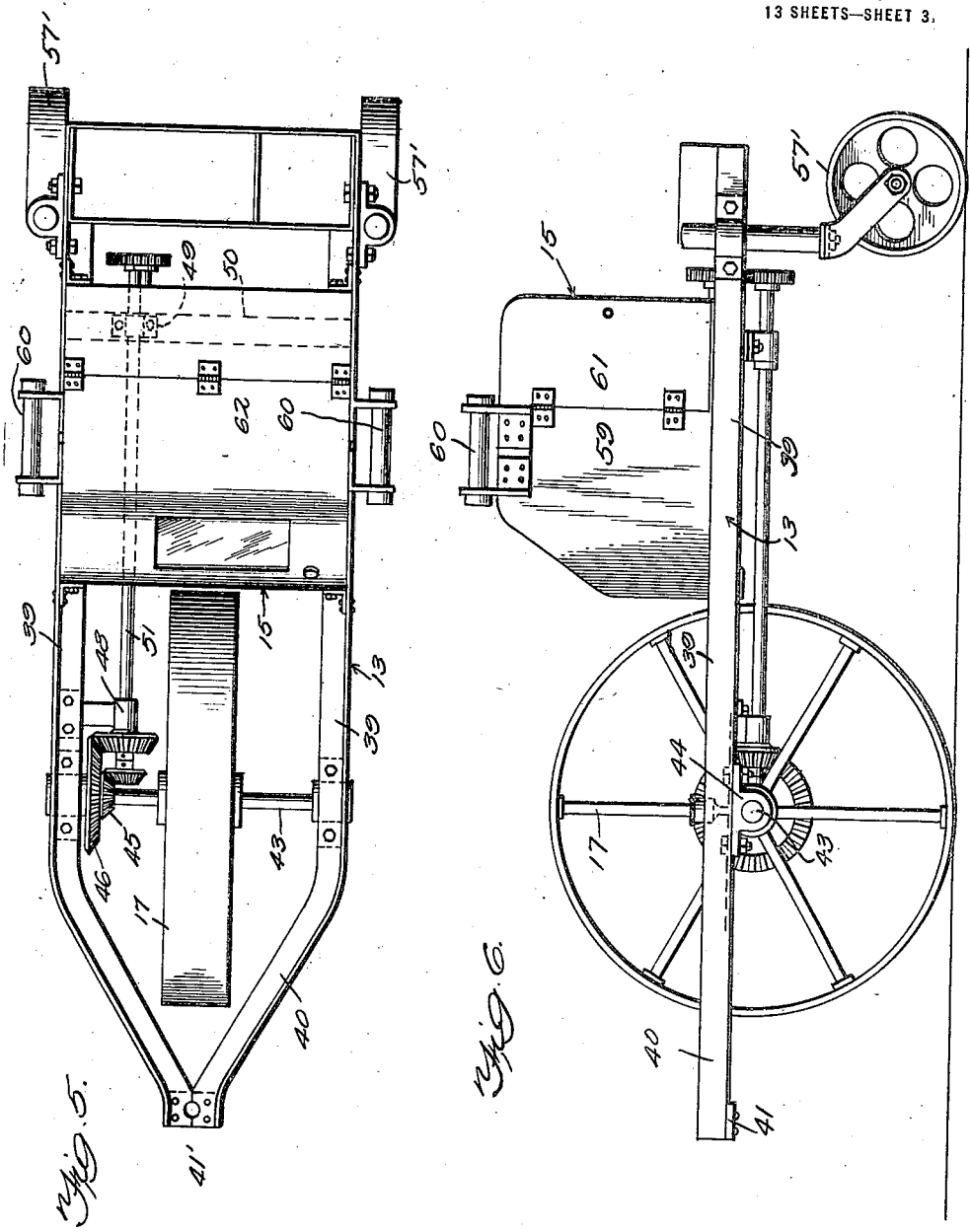
Inventor
E. M. Burr,
By
Attorney

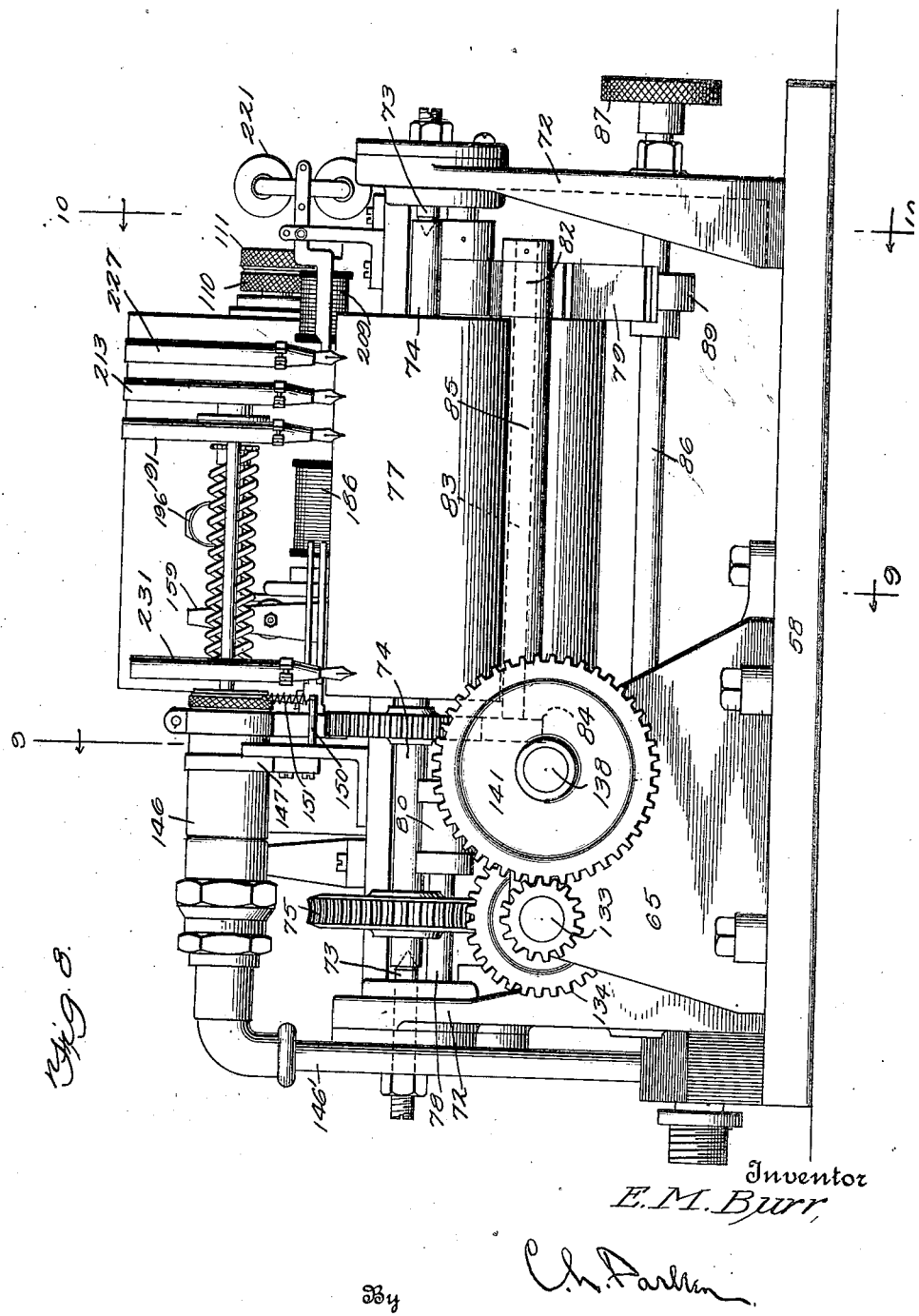

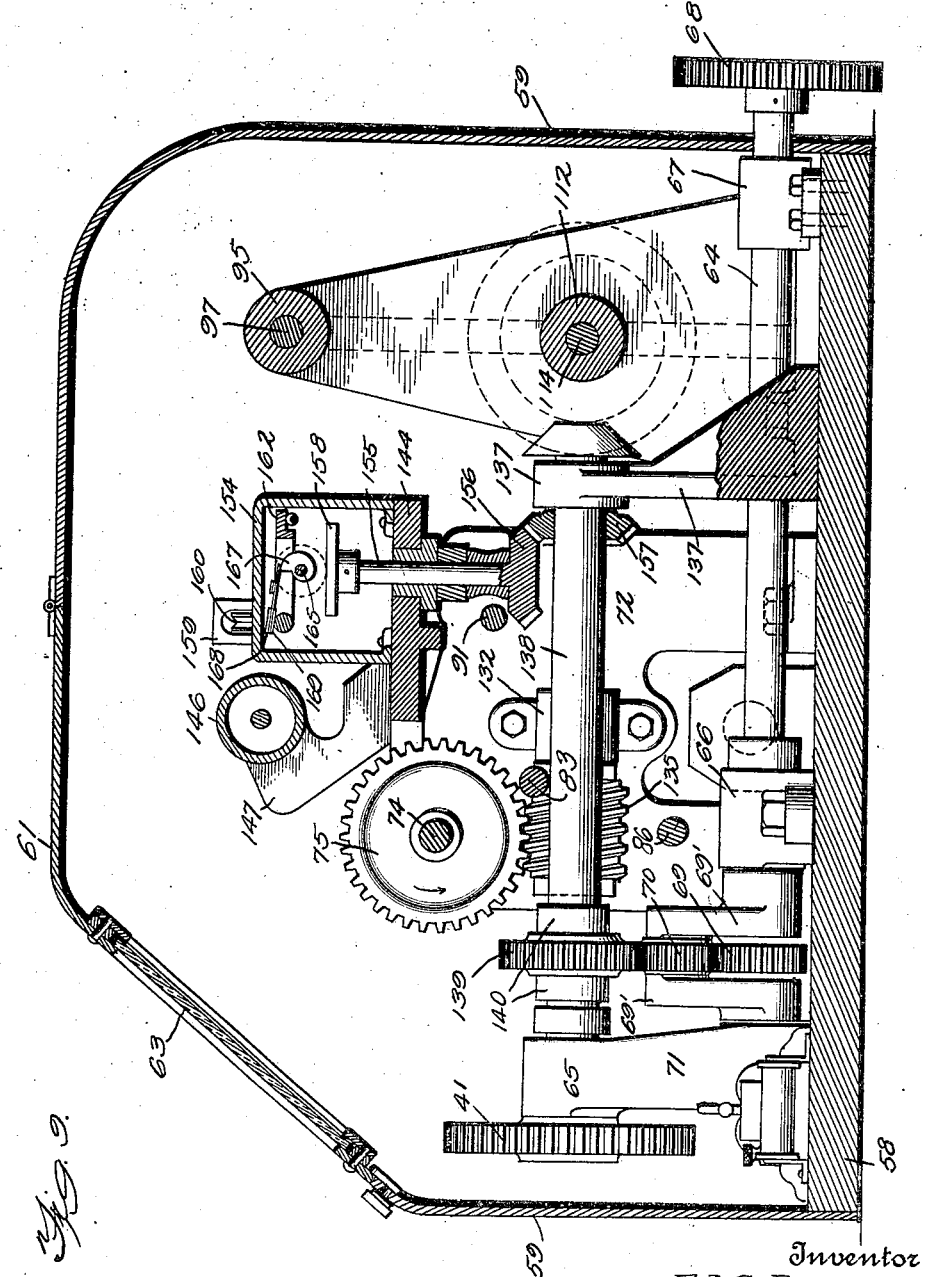

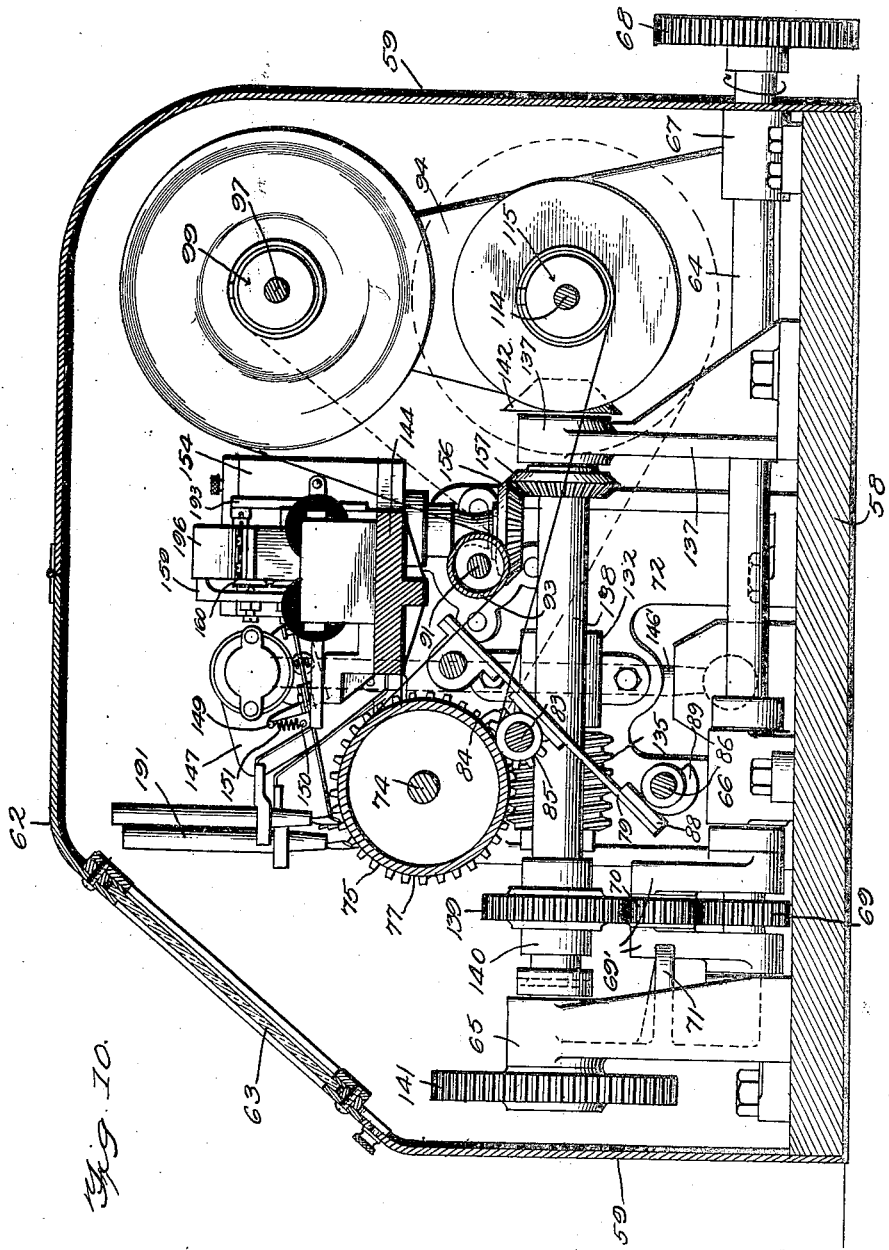

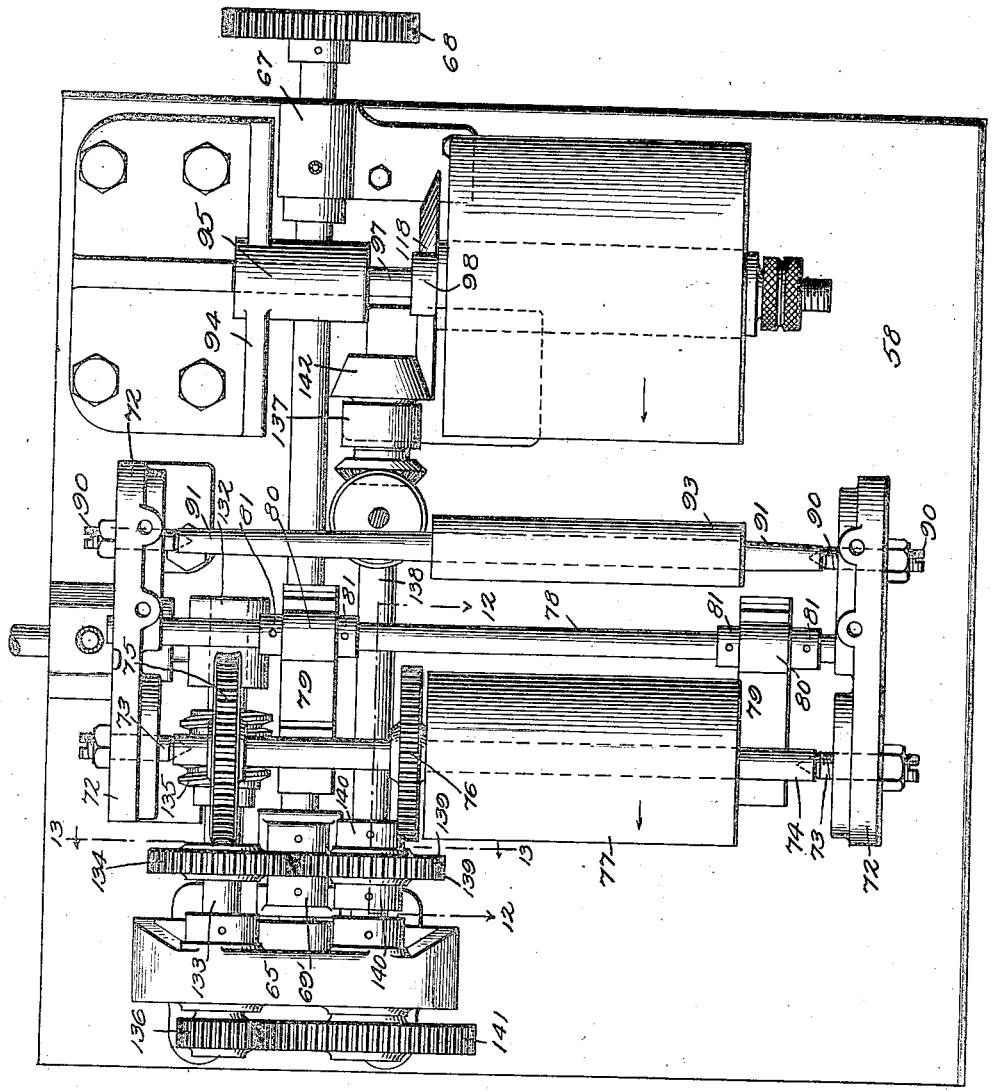

E. M. BURR.
DYNAMOMETER.
APPLICATION FILED JAN. 23, 1920.

1,433,067.

Patented Oct. 24, 1922.
13 SHEETS—SHEET 8.

Inventor
E. M. Burr,

By
Attorney

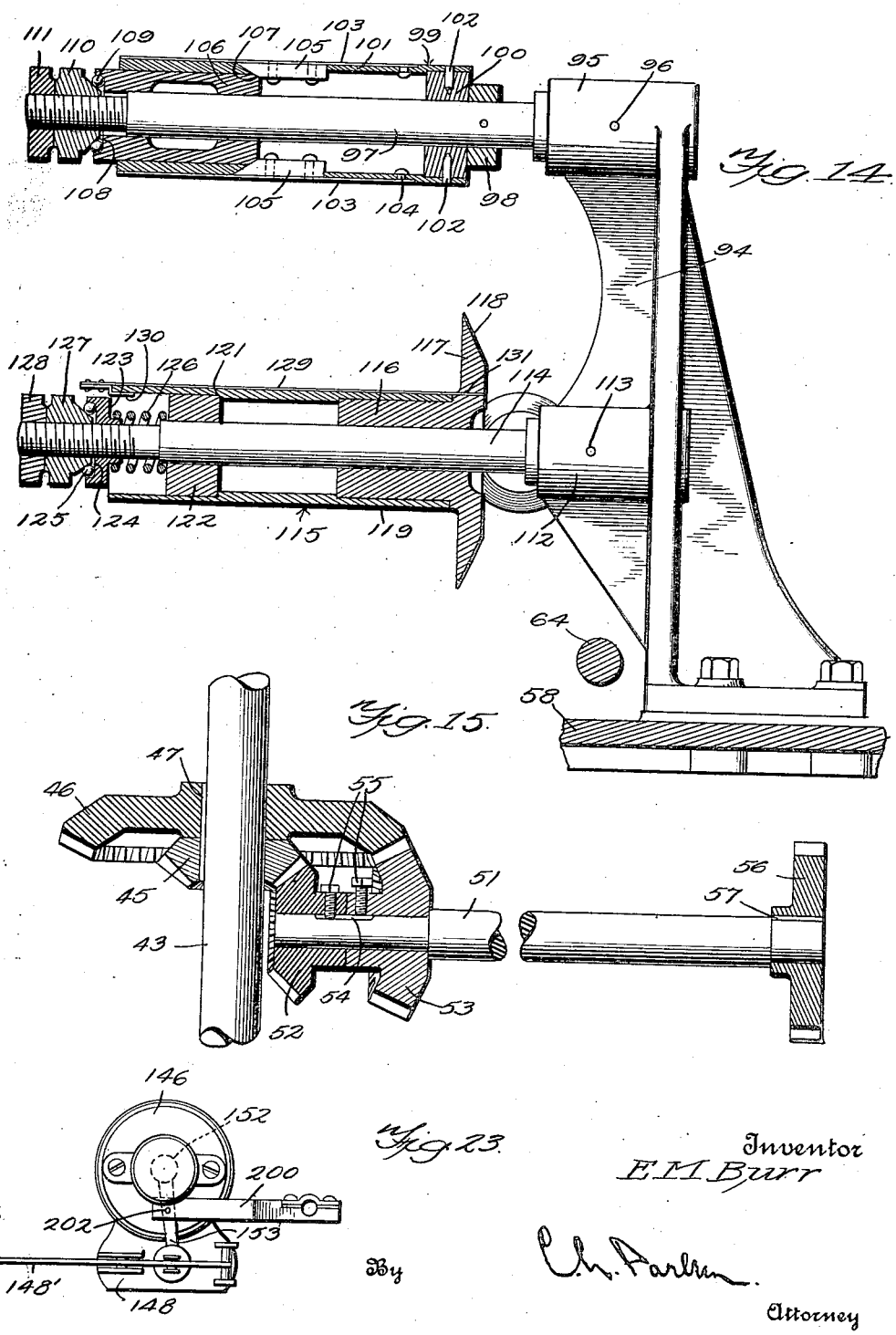

E. M. BURR.
DYNAMOMETER.
APPLICATION FILED JAN. 23, 1920.

1,433,067.

Patented Oct. 24, 1922.
13 SHEETS—SHEET 10.

Inventor
E. M. Burr
By Chs. Farben
Attorney

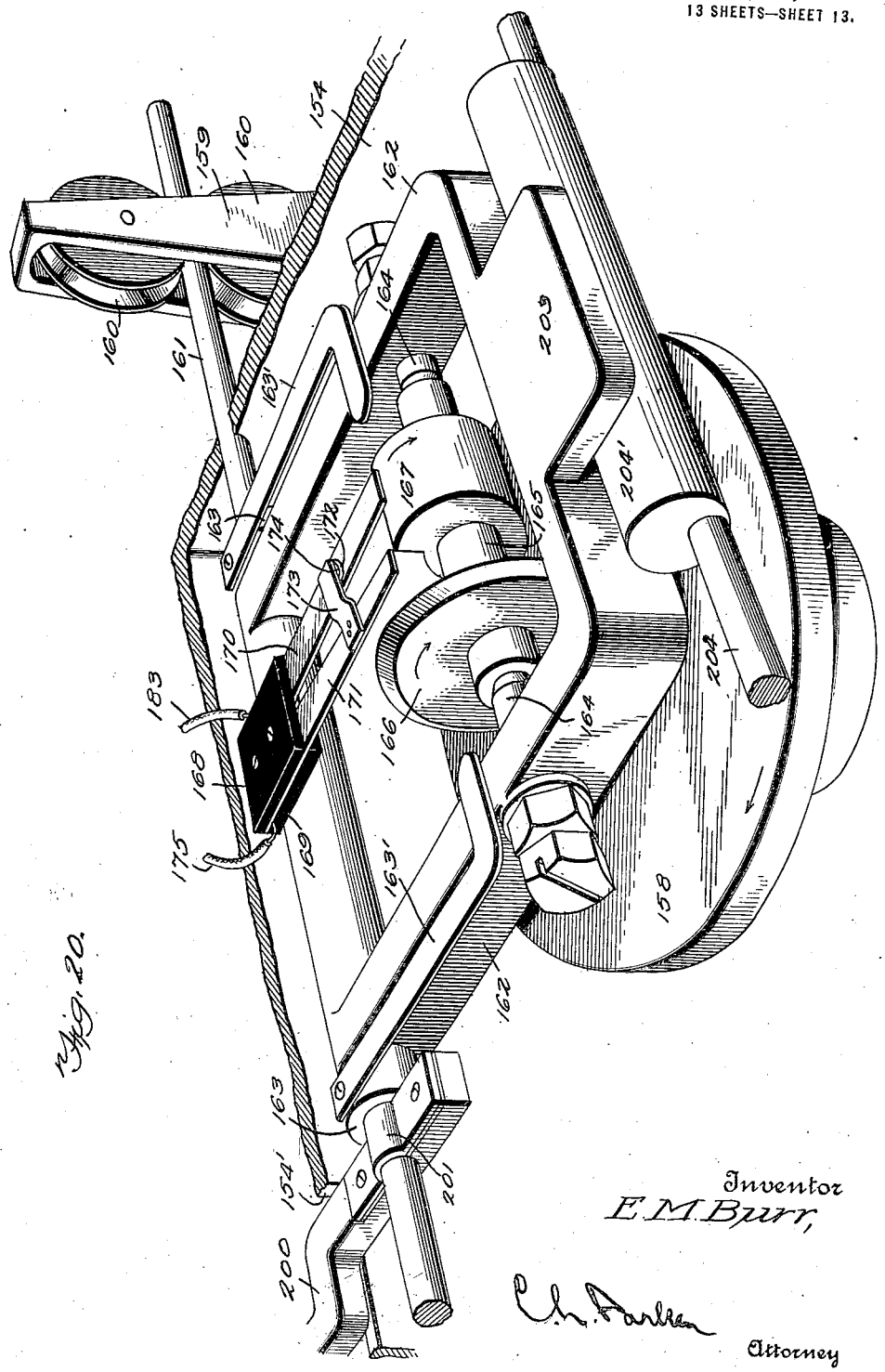

Patented Oct. 24, 1922.

1,433,067

UNITED STATES PATENT OFFICE.

ELLIS M. BURR, OF CHAMPAIGN, ILLINOIS, ASSIGNOR TO THE BURR COMPANY, OF CHAMPAIGN, ILLINOIS, A CORPORATION OF ILLINOIS.

DYNAMOMETER.

Application filed January 23, 1920. Serial No. 353,550.

*To all whom it may concern:*

Be it known that I, ELLIS M. BURR, a citizen of the United States, residing at Champaign, in the county of Champaign and State of Illinois, have invented certain new and useful Improvements in Dynamometers, of which the following is a specification.

This invention relates to new and useful improvements in recording dynamometers.

An important object of the invention is to provide a recording mechanism whereby the elements necessary for the computation of the horsepower of a power vehicle in use for traction purposes or the horsepower necessary to draw an implement, may be automatically recorded.

A further object is to provide a recording mechanism which will automatically record all of the elements necessary to the computation of the horsepower.

A still further object is to provide an apparatus whereby the area between the base line and irregular curve having the base line for zero, may be automatically computed.

A further object is to provide a novel and efficient paper drive for use in recording machines.

A further object is to provide in an apparatus of the above described character, means whereby the mechanism of the apparatus is driven constantly in one direction whether the draft implement and drag to which the apparatus is attached, is driven in the forward or reverse direction.

Other objects and advantages will be apparent throughout the course of the following description.

In the accompanying drawings wherein for the purpose of illustration is shown a preferred embodiment of my invention and wherein like numerals designate like parts throughout, Figure 1 is a plan view of my apparatus in use for obtaining the horsepower of a tractor in hauling a drag.

Figure 2 is a section on the line 2—2 of Figure 1.

Figure 3 is a section on the line 3—3 of Figure 2.

Figure 4 is a section on the line 4—4 of Figure 2.

Figure 5 is a top plan view of the land wheel carriage showing the recording mechanism in position thereon.

Figure 6 is a side elevation of the land wheel carriage.

Figure 7 is a detailed view showing the character of the drives between the recording mechanism and land wheel carriage.

Figure 8 is a front elevation of the recording mechanism, the casing being removed.

Figure 9 is a section taken on the line 9—9 of Figure 8.

Figure 10 is a section taken on the line 10—10 of Figure 8.

Figure 11 is a top plan view illustrating the paper and recording mechanism drives.

Figure 14 is a sectional view partly in elevation showing the paper roll receiving drum and the paper re-wind roll.

Figure 15 is a detailed sectional view showing the drive of the land wheel carriage.

Figure 19 is a wiring diagram of the recording mechanism.

Figure 20 is a perspective view showing the mechanism of the automatic integrator.

Figure 22 is a fragmentary plan view showing the connection of the integrator with the indicator, and Figure 23 is an end elevation of the indicator and the integrator attaching arm.

Figure 12:
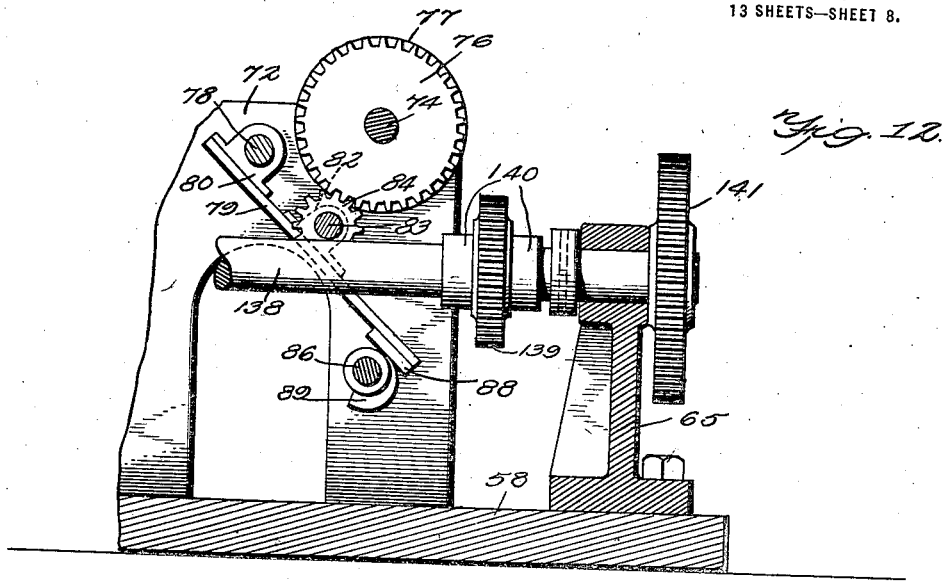
Figure 12 is a section on the line 12—12 of Figure 11.

Referring now to the drawings and more particularly to Figures 1, 2, 3, and 4, the numeral 10 indicates a tractor, and the numeral 11 a member drawn by the tractor, represented in the present instant as a drag. Interposed between the tractor and the drag is a dynamometer pressure cylinder 12. A land wheel carriage 13 secured to the drag, by means of a bracket 14, carries an automatic recording mechanism 15 which is connected with the pressure cylinder 12 through medium of conduit 16 and is connected by means of a suitable drive with a land wheel 17, carried by the land wheel carriage 13.

The dynamometer pressure cylinder 12 comprises a cylinder 18, having secured thereto by means of bolts 19 or the like, a V-shaped strap 20, which receives a connection member 21 secured to the drawn member. Within the cylinder 18 is a piston 22 having a piston rod 23 connected thereto and extending through the rear cylinder head thereof. Formed upon the sides of the cylinder 18 are guides 24, adapted to slidably receive yoke bars 25. The yoke bars 25 are connected at their rear ends by yoke 26 which contacts the rear ends of the piston rod 23. At their forward ends the yoke rods 25 are connected by a second yoke 27 having pivotally secured thereto as by means of pin 28, a member 29. The member 29 has its forward end bifurcated to form spaced arms 29′ which are connected by a transverse member 30 which is adapted to receive the clevis 31 of the tractor 10. The forward end of the cylinder is provided with an outlet 32 adapted to receive the forward end of the conduit 16. The cylinder 18 is also provided upon its side with a pump cylinder 33, having communication with the rear end of the cylinder 18 through medium of port 34 and the forward end of the cylinder through medium of port 35. The port 35 is normally closed through medium of the needle valve 36 operated by a suitable handle 37. In use the forward end of the cylinder 18 is filled with a suitable liquid such as oil or the like.

It will be obvious that as the drag 11 is drawn by the tractor 10, the yoke 26 bears against the end of the piston rod 23, forcing the piston 22 forwardly and compressing the fluid in the forward end of the cylinder and in the conduit 16. In event of any leakage past the piston 22 to the rear portion of the cylinder, this leakage may be transferred to its proper place at the forward end of the cylinder by reciprocating the pump piston 38 within the cylinder 33.

Referring now more particularly to Figures 5, 6, and 15, the land wheel carriage comprises angle iron side bars 39, which converge at their forward ends as at 40 and are secured together in any suitable manner as by means of plate 41. An opening 41′ is formed in the arms at the forward junction thereof to receive an attaching member 42. A transverse shaft 43 mounted in journals 44 secured to the side members 39 is provided to which the land wheel 17 is secured. This shaft is also provided with a small bevel gear 45 and a large bevel gear 46 secured to the shaft by means of a key 47. Mounted in a journal 48, adjacent the shaft 43 and secured to one of the side members 39, and in a second journal 49, secured to a cross brace 50 connecting the side members 39, is a longitudinal shaft 51. Mounted upon the end of the shaft adjacent the shaft 43 are bevel gears 52 and 53. A keyway 54 is provided in the shaft and the gears 52 and 53 are each provided with a screw 55 adapted to be fitted in the groove or keyway 54. The gear 52 meshes with the gear 45 and is the same size as the gear 45, and the gear 53 meshes with the gear 46 and is of a smaller diameter than the gear 46. It will be seen that if the screw 55 of the gear 52 engages the groove 54 of the shaft 51, the shaft 51 will be driven at the same speed as the shaft 43. If, however, the screw 55 of the gear 53 engages in the groove, the shaft 51 will be driven at a higher rate of speed than the shaft 43. The opposite end of the shaft 51 is provided with a gear 56 keyed to the shaft as at 57. At the rear end the land wheel carriage 13 is supported by caster wheels 57′.

Referring now to Figures 5, 6, 9, and 10, the automatic recording mechanism 15 embodies a base 58 and a casing 59. The casing 59 is, for convenience in transportation, provided with handles 60. The casing is also provided with hinged doors 61 and 62 for the purpose of allowing access to the interior mechanism and the door 62 is provided with a transparent window 63, through which the mechanism may be observed during operation.

Figure 13:
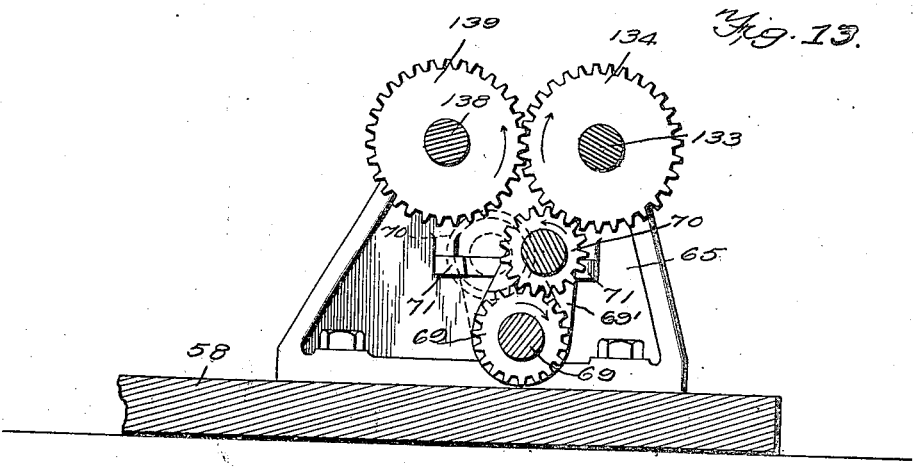
Figure 13 is a detailed section showing the automatically reversing gear.

Referring now to Figures 9, 10, and 11, numeral 64 designates a main drive shaft having its forward end journaled in a bracket 65 secured to the base 58. Journals 66 and 67 secured to the base 58 are also provided. The rear end of the shaft 64 projects without the casing and is provided with a gear 68 meshing with the gear 56 of the shaft 51, as more clearly shown in Figure 7. Adjacent the bracket 65, the shaft 64 is provided with the gear 69 secured to the shaft. Rotatably mounted upon the shaft on either side of the gear 69 are arms 69′ between the outer ends of which is rotatably mounted gear 70, meshing with the gear 69. The foremost of the arms 69′ operates between spaced shoulders 71, formed upon the bracket 65, as more clearly shown in Figure 13.

As more clearly shown in Figures 8, 11, and 12, the base 58 is provided upon each side thereof with an upstanding bracket 72 in which are mounted adjustable bearing members 73 between which is rotatably mounted a shaft 74. The shaft 74 is provided with a worm gear 75 and a gear 76. Secured to the shaft 74 adjacent the gear 76 is a paper roll or drum 77. Secured in the brackets 72 is a shaft 78 having mounted thereon arms 79 which rotatably engage the shaft 78 as at 80, the arms being held against longitudinal movement by means of fixed collars 81. The arms 79 are provided intermediate their ends with journals 82 which rotatably receive a shaft 83. This shaft has secured thereto a gear 84 meshing with the gear 76 and a roll 85 engaging the roll 77. The gears 76 and 84 and drums or rolls 77 and 85 are so proportioned that the peripheries of the drums travel at the same linear speed. Rotatably mounted in the brackets 72 is a third transverse shaft 86 provided upon one end with an operating thumb nut 87. The lower ends of the arms 79 are provided with hard metal contact plates 88. Mounted upon the shaft 86 and secured thereto are cams 89 engaging the contact plates 88 of the arms 79. It will be obvious that by rotating the shaft 86, the tension of the roller 85 carried by the shaft 83 against the roll 77, carried by the shaft 74, may be regulated. The brackets 72 are further provided with a second set of adjustable bearing members 90 which rotatably receive therebetween a shaft 91. This shaft has secured thereto an idler roller 93 alined with the rolls 77 and 85.

Referring now to Figures 11 and 14, the numeral 94 designates a standard secured to the base 58. To the upper end of the standard 94 as at 95, is secured by means of pin 96, a shaft 97. This shaft has secured thereto adjacent the standard 94 a fixed collar 98. Abutting the fixed collar 98 is a paper roll receiving member 99. The paper roll receiving member 99 comprises an end member 100 rotatably mounted upon the shaft 97 and receiving about its outer face one end of a hollow cylinder 101. This cylinder is secured to the end member 100 by means of pins 102. Secured to the outer face of the cylindrical member 101 as at 104, are expansible members 103. These members have secured to their inner faces cam blocks 105 having one end thereof provided with a cam face. Rotatably mounted about the shaft 97 and longitudinally shiftable thereon is a cylindrical member 106 interiorly fitting the cylindrical member 101. This member is provided upon its inner end with a cam face 107 adapted to engage the cam faces of the members 105. The outer end of the member 106 is provided with an annular groove 108 within which are disposed thrust balls 109. The end of the shaft 97 is threaded and has mounted thereon a nut 110 having a tapered face which engages the thrust balls 109. This nut may be locked in position by means of lock nut 111. It will be obvious that when a roll of paper is placed upon the member 99, expansible members 103 may be shifted outwardly to grip the interior of the roll by adjusting the nut 110.

Approximately midway the height of the standard 94 as at 112 is a shaft 114, secured against rotation by means of a pin 113. Mounted upon the shaft 114 is a paper rewind roll 115. The re-wind roll 115 comprises an end member 116 cylindrical in form which is slidably and rotatably mounted upon the shaft 114. The member 116 is provided upon its end adjacent the standard 94 with a flange 117 provided with an angular friction face 118. Surrounding the member 116 is a cylindrical body portion 119. The bore of the member 119 is enlarged as at 120 forming an annular shoulder 121. Slidably and rotatably mounted upon the shaft 114 is a member 122 internally fitting the enlarged bore 120 of the cylindrical member 119 and abutting the annular shoulder 121. The end of the shaft 114 is provided with screw threads upon which is slidably mounted collar 123. This collar is provided upon its outer face with an annular groove 124 receiving thrust balls 125. Intermediate the inner face of the collar 123 and the member 122 and surrounding the shaft 114, is a compression spring 126. Mounted upon the screw threads of the shaft 114 is a nut 127, similar to the nut 110 mounted upon the shaft 97. This nut is also engaged by a lock nut 128. A clip 129 is provided for securing the paper to the roll having upon its outer end, a portion 130 of which abuts the end of the cylindrical member 119 and engages the inner wall thereof. The opposite end of the clip 119 fits within a recess formed in the flange 117 as at 131. In use, the roll of paper is placed upon the member 99 and passes therefrom about the idler roller 93, about the drum 77, intermediate the drums 77 and 85, and is wound upon the re-wind roll 115 as more clearly shown in Figure 10.

Referring now to Figures 8 to 13 inclusive, the numeral 132 designates a journal secured to one of the side brackets 72. Mounted in this journal and in the bracket 65, secured to the forward end of the base 58, is a shaft 133, having secured thereto a gear 134 which normally meshes with the gear 70 carried by the arms 69'. The shaft 133 is provided with a worm 135 which meshes with the worm gear 75 upon the shaft 74. The forward end of the shaft 133 extends through the bracket 65 and is provided with pinion 136. Secured to the base 58 is a bracket 137. Mounted in the bracket 137 and in the bracket 65 is a rotatable shaft 138 having rotatably mounted thereon a gear 139 of the same size as and meshing with the gear 134 secured to the shaft 133. The gear 139 is held from shifting upon the shaft 138 by means of fixed collars 140. The forward end of the shaft 138 extends through the bracket 65 and is provided with a gear 141 meshing with the pinion 136.

It will be seen that when the land wheel carriage is moving forwardly, the gear 68 and shaft 64 are rotated in the direction of the arrow upon Figure 10. While the shaft 64 is rotating in this direction, the gear 70 is meshing with the gear 134 as more clearly shown in Figure 13 rotating it in the direction of the arrow. Through medium of the worm 135 formed on the shaft 133 to which the gear 134 is secured, the drum 77 is rotated in the direction of the arrow upon Figure 11. The pinion 136 upon the forward end of the shaft 133 meshing with the gear 141 upon the shaft 138, rotates the shaft 138 and the friction element 142 thereof, driving the re-wind roll 118. If, however, the shaft 64 is rotated in the opposite direction as when the land wheel carriage 13 is moved rearwardly, the swinging arms shift over to contact the other of the stops 71 and the gear 70 now meshes with the gear 139 which is loosely mounted upon the shaft 138. It will be obvious that the gear 134 is now driven by the gear 139 in the same direction in which it moved when directly engaged by the gear 70. Consequently the shafts 133 and 138 which form the paper drive, always move in one direction and the paper consequently may not pile up during the reverse movement of the land carriage.

It will also be noticed that the rolls 77 and 85 have a very firm engagement upon the paper as it passes between them at a speed directly proportional to the speed of rotation of the shaft 64. The speed of the latter shaft, as we have seen before, is directly proportional to the speed of the land wheel. The linear speed of the drum of the rewind roll 115 is the same as the linear speed of the drum 77. As the paper is wound upon the re-wind roll 115, the linear speed of the drum of the roll increases as will be obvious. As the drive of the roll is a friction drive, however, this drive will slip and only serve to roll the paper when there is any slack between the junction of the rolls 77 and 85 and the paper re-wind roll 115. Therefore the linear speed of the paper is directly in ratio with the speed at which the land wheel 17 is drawn over the ground by the tractor.

The recording mechanism above described forms no part of the present invention, except in the combination claimed, and the detailed construction thereof is claimed in a co-pending application.

Referring now more particularly to Figures 8, 9, 10, and 16 to 23, inclusive, the numeral 144 designates a support hereinafter to be referred to as the bridge. This support is secured upon the upper surface of the brackets 72 by means of bolts 145 or the like. Mounted above the bridge is an indicator 146 of any suitable type, that illustrated being the standard indicator manufactured by the Ashcroft Manufacturing Company. This indicator is supported in its elevated position by means of a bracket 147. The oscillatory portion of the indicator 148 which carries the pencil bearing arm 148' has secured thereto a bracket 149. A pin 150 is mounted in the bracket 147 and a spring 151 connects the pin 150 and the bracket 149, holding the pencil carried by the pencil bearing arm 148' in firm engagement with the paper passing about the drum 77. The indicator 146 is connected in any suitable manner as at 146' with the conduit 16 which is in communication with the dynamometer pressure cylinder 12. It will be obvious that a change of pressure within the indicator 146 will cause the pencil bearing arm 148' to shift forming the line designated on Figure 21, as draw-bar pull, the piston 152 being connected to the pencil bearing arm by a lever 153 as is well known.

Secured upon the bridge 144 adjacent the indicator 146, is a casing 154. Rotatably mounted in the bridge 144 is a vertical shaft 155 having secured to its lower end a bevelled gear 156 which meshes with a bevelled gear 157 secured to the shaft 138. Secured to the upper end of the shaft 155 is a disc 158. Mounted adjacent the sides of the casing 154 are brackets 159 having mounted therein pairs of guide wheels 160 which receive a shaft 161 extending through apertures formed in the sides of the casing. Mounted for oscillation upon the shaft 161 within the casing 154 is a yoke 162. The yoke is held against longitudinal displacement upon the shaft by means of fixed collars 163. Secured to the fixed collars 163 are springs 163' which bear against the upper surface of the yoke 162. Mounted in the sides of the yoke 162 are adjustable bearing members 164 which receive therebetween a shaft 165. This shaft has secured thereto a chilled steel friction wheel 166 which normally engages the disc 158 at the center thereof as more clearly shown in Figure 16. The shaft 165 has also mounted thereon a trip cam 167. Secured to the yoke 162 are blocks of insulating material 168 and 169 having mounted therebetween a pair of spaced contact bearing arms 170 and 171. The arm 170 is slightly longer than the arm 171 and extends within the path of the cam 167 and is provided upon its upper surface with a contact 172. The arm 171 is provided with a contact bearing element 173 electrically connected with the arm and provided with a contact 174 normally disposed above the contact 172. At each revolution of the cam 167, the contact arm 170 is elevated bringing the contacts 172 and 174 into engagement.

Figure 16:
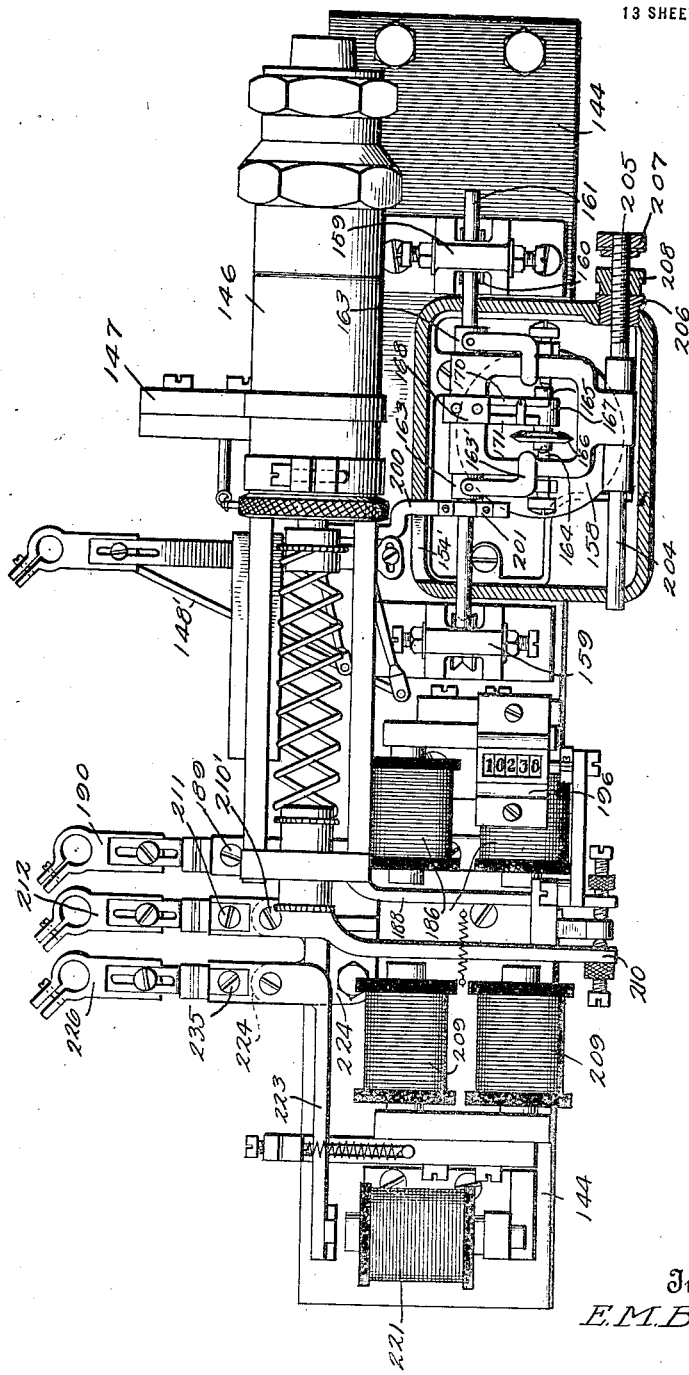
Figure 16 is a top plan view of the bridge and its associated mechanism.
Figure 17:
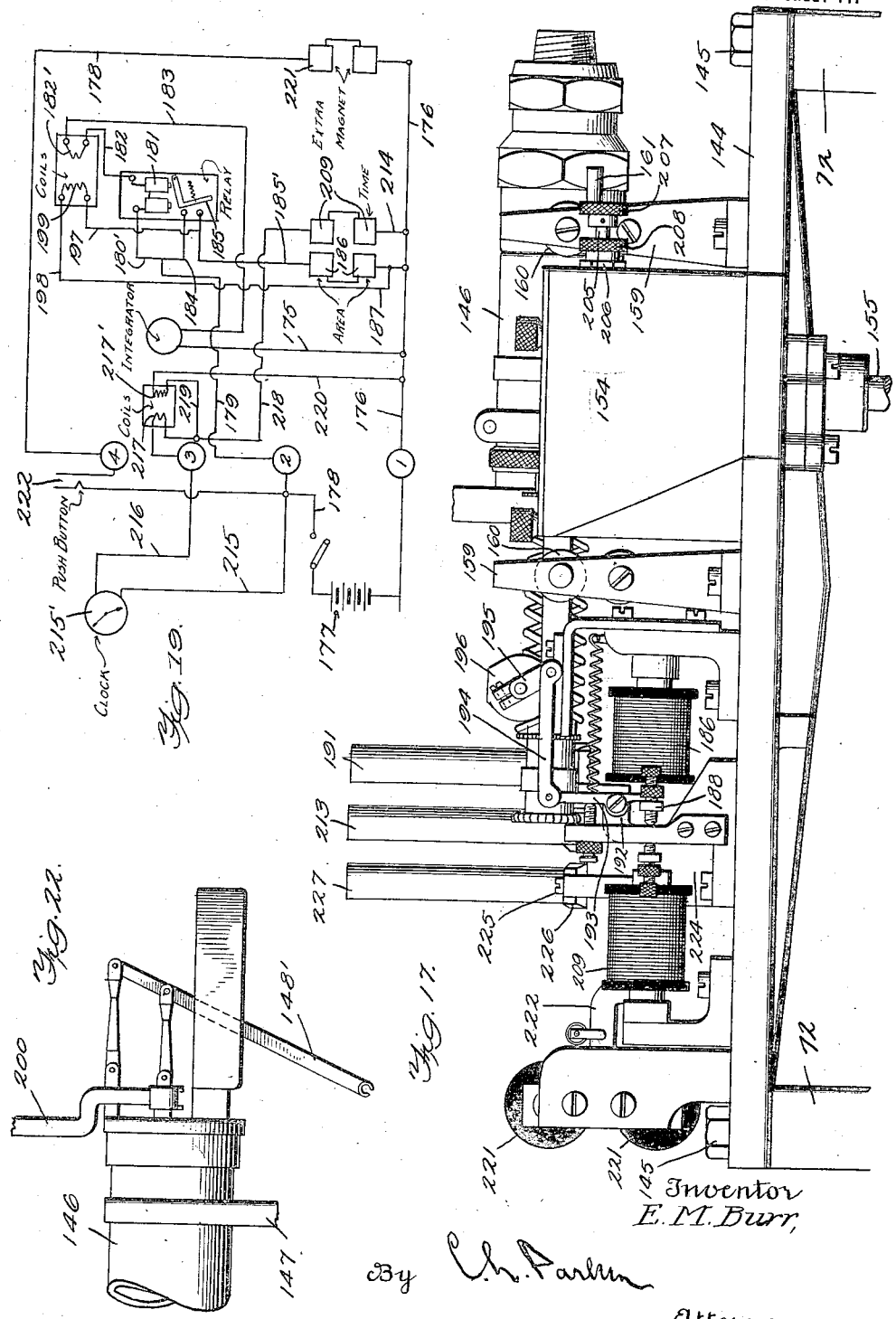
Figure 17 is a rear elevation of the bridge and its associated mechanism.
Figure 18:
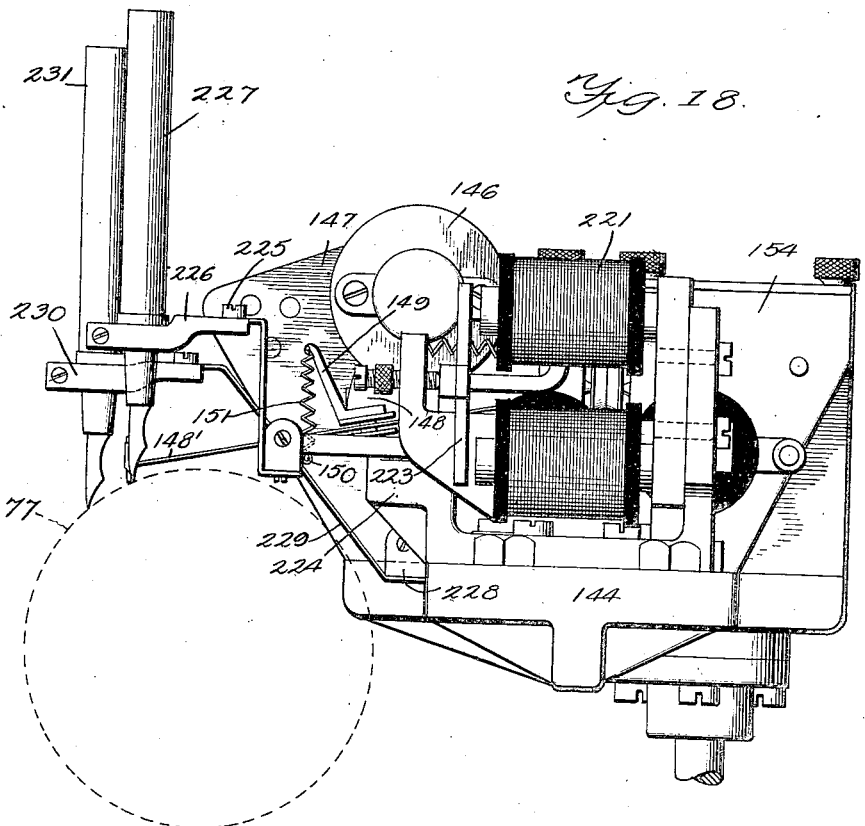
Figure 18 is an end elevation of the bridge.
Figure 21:
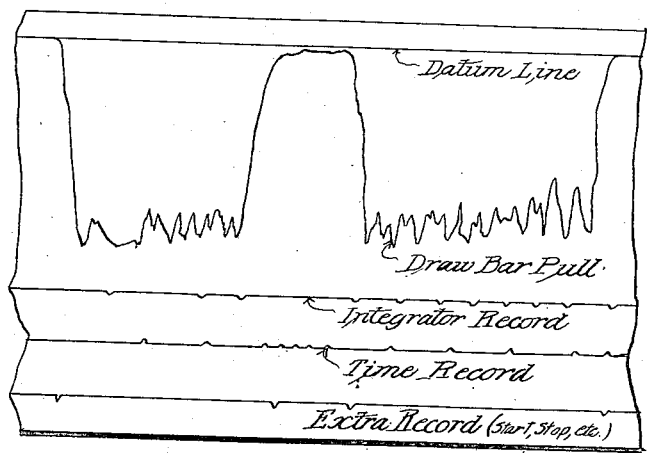
Figure 21 is a plan view of a portion of a chart formed by my apparatus.

The arm 171 is connected, as clearly shown by Figure 19, by means of a wire 175 and wire 176 with one pole of a battery 177. The opposite pole of the battery is connected by wires 178, 179, and 180 with one terminal of the magnets 181 of a relay. The other terminal of the magnets is connected by a wire 182 with a low resistance coil 182' which is in turn connected with the other arm 170 of the yoke 162 by means of a wire 183, the purpose of the coil 182' being to limit the amount of current passing through the relay coils. It will be seen that when the contacts 172 and 174 are connected, the magnets 181 of the relay are energized attracting the relay switch 185 and connecting the terminals of the relay. The current now flows from the battery 177 through wire 178, wire 179, wire 184, relay switch 185, wire 185', electromagnets 186. The electromagnets 186 as clearly shown in Figure 16 are provided with an armature 188 having secured thereto as at 189, a holder 190 adapted to receive a fountain pen 191, which bears against the paper passing about the roll 77. Accordingly when the electromagnets are energized, the armature 188 is attracted and pen 191 shifted laterally forming a jog in the line formed by the pen. This line corresponds to that indicated on Figure 21 as the "integrator record."

Mounted upon the bridge 144 adjacent the armature 188 is a bracket 192 having pivoted thereto intermediate its ends a lever 193. The lower end of this lever engages the armature 188 and the upper end is pivoted to the link 194 connected to operating arm 195 of a counter 196. It will be seen that as the electromagnets 186 are energized, the counter 196 is operated. To prevent disastrous sparking at the terminals of the relay connected by the relay switch 185, a resistance coil 199 is connected with the wire 185' by means of a wire 197 and with the wire 187 by means of a wire 198. It will be seen that the resistance coil 199 is in shunt with the electromagnets 186.

The parts included within the casing 154 will be hereinafter referred to as the integrator. The integrator shaft 161 has secured thereto as at 201, an arm 200. This arm extends through the casing 154 operating within a slot 154' formed in the casing. The opposite ends of the arm 200 is connected as at 202 to the operating arm 153 of the indicator 146, as clearly shown in Figures 22 and 23.

It will be seen that as pressure is applied within the indicator 146 not only is the pencil arm 148' actuated but the yoke 162 is shifted through medium of arm 200 and shaft 161. As the yoke is shifted the friction wheel 166 passing from the center of the disc will be rotated by the rotation of the disc. As the distance from the center increases so does the rate of speed of rotation. The friction disc 166 is so proportioned that it makes one complete revolution for each square inch of area which lies between the lines indicated upon Figure 21 as the "datum line" and the "draw-bar pull".

The yoke 162 is provided upon the free end thereof with an outstanding lip 203. Shaft 204 is rotatably mounted in the casing 154. This shaft is provided with an enlarged portion 204', cylindrical in shape and eccentrically disposed to the shaft. One end of the shaft is threaded as at 205 and engages an internally threaded member 206 mounted in one wall of the casing 154. The shaft is provided upon its end with an operating nut 207 by means of which it may be adjusted longitudinal of the casing or rotatably. A lock nut 208 is provided for securing the shaft in any desired position.

Secured upon the bridge 144 is a second pair of electromagnets 209 having an armature 210 pivoted to a bracket 224 as at 210'. This armature has connected thereto as at 211, a pen receiving arm 212, adapted to receive a fountain pen 213. This fountain pen forms the line designated upon Figure 21 as "time record". The magnets 209 as clearly shown in Figure 19 are connected by means of wire 214 with wire 176 and battery 177. From the opposite pole of the battery the current flows through wire 178, wire 215, clock 215', wire 216, coil 217 and wire 218, back to the magnets. The clock is provided with apparatus whereby it completes the circuit between wires 215 and 216, at stated intervals, as for example every ten seconds. To prevent sparking at the contacts of the clock upon breaking of the circuit, the magnets 209 are connected in shunt with a resistance coil 217' by means of wire 219 connected with one terminal of the coil and with wire 218, and wire 220 connected with the opposite terminal of the coil and with wire 176. The purpose of the coil 217 is to limit the amount of current delivered to the coils 209.

Mounted upon the bridge is a further pair of coils 221 to which a circuit is completed through wires 178 and 176 by means of a push button 222 or the like. These electromagnets are provided with an armature 223 pivoted to bracket 224. The outer end of the armature 223 has secured thereto as at 225, a pen receiving arm 226 which receives a fountain pen 227. This pen forms the line designated upon Figure 21 as "extra record" and will be used to designate starts, stops, and interruptions.

Secured to the bridge 144 as at 228 is a spring arm 229 having secured thereto a pen receiving arm 230 which receives a fountain pen 231. This pen forms a line designated upon Figure 21 as the "datum line." When the pencil of the pencil receiving arm 148' is at rest or at the point which it assumes when there is no pressure within the indicator 146, the line formed by the pencil and the line formed by the fountain pen 231 coincide. It will be therefore, obvious that the pressure will be measured from the datum line to the line formed by the pencil of the draw bar pull indicator.

In operation, the dynamometer cylinder 12 is secured intermediate the tractor 10 and the load 11 as suggested by Figure 1. The land wheel carriage 13 is then secured either to the load being drawn or to the tractor in any suitable manner so as to cause it to travel at the same rate of speed as the tractor. The pressure caused by the draw-bar or grip pull of the tractor upon the fluid contained within the cylinder is transmitted to the indicator 146. The motion of the land wheel carriage 13 is transmitted within the casing by the shaft 64 as previously described and the paper is drawn about the drum 77 at a rate of speed corresponding to the speed of the tractor. The integrator is brought into operation as previously described as soon as pressure is imparted to the indicator 46 and consequently forms a record as shown upon Figure 21 as previously described. The clock also operates to give a time record of the operation. The extra record is actuated at each start, stop, or interruption.

The calculation of the results from the paper record is so simple as to be practically obvious but is given for the purpose of clarity. The area record divided by paper travel gives the average height of the indicator card in inches, that is to say by counting the number of jogs formed in the line indicated in Figure 21, as the integrator record and dividing this number by the number of inches of paper upon which the record appears, the average height of the line indicated as drawbar pull upon Figure 21 from the datum line upon the same figure, may be secured. If this average height is now multiplied by the number of pounds of force necessary to move the indicator pencil one inch, the mean tractor pull in pounds is determined. Having the time record and knowing the rate of paper travel through land wheel travel, the horsepower developed by the tractor at drawing the load is easily determined. It will be seen that the extra record is supplied to the calculator to eliminate all records which should not be included in the calculation.

These calculations may be further simplified by the use of a constant secured as follows. In a given test each inch in height on the pressure line represents a known pull in pounds. Each inch of paper travel represents a known distance covered in feet. Therefore, every square inch under the pressure line represents a constant number of foot pounds. Multiplying the area record which may be obtained by counting the jogs in the line designated as "integrator record," or by substracting from the total shown upon the calculator, the total which was shown thereby before the test was started, by the constant gives the total number of foot pounds and having the time record, the horsepower developed is easily determined. The mean tractor pull in pounds may then be secured by dividing the total foot pounds by the distance covered in feet.

As many changes are possible in the shape, size, and arrangement of the various parts herein shown and described, I do not limit myself to the specific structure described, but may make any such changes without departing from the spirit of the invention or the scope of the subjoined claims.

What I claim is:

1. In apparatus for securing the horsepower of tractors and the like, a paper strip, means for moving the strip at a speed proportional to the speed of the tractor, means for forming a base line upon the strip, means for recording the tractor pull in pounds upon the strip, the record of said tractor pull coinciding with said base line when the tractor pull is at zero, an integrator to record each square inch of area between said base line and said tractor pull record, and means for recording spaced intervals of time upon said strip.

2. In apparatus for securing the horsepower of tractors and the like, a paper strip, means to cause the strip to travel at a speed directly proportional to the speed of the tractor, means for forming a base line upon the strip, means for recording the tractor pull in pounds upon the strip, the record of said tractor pull coinciding with said base line when the tractor pull is at zero, an integrator to record each square inch of area between said base line and said tractor pull record, and means for recording spaced intervals of time upon said strip.

3. In a device of the type described, as a sub-combination, means for representing area, said means comprising a traveling strip, means for forming a base line on said strip, a shiftable member having a writing implement normally engaging said strip at the base line, means for shifting said member to form an irregular curve, a rotatable disc, a rotatable friction wheel connected with said member to be shifted thereby and normally engaging said disc centrally thereof, and means for recording each rotation of said wheel.

4. In a device of the type described, as a subcombination, means for representing area, said means comprising a traveling strip, means for forming a base line on said strip, a shiftable member having a writing implement normally engaging said strip at the base line, means for shifting said member to form an irregular curve, a rotatable member, means to cause said member to rotate at a speed varying directly with the product of the speed of the paper and the distance between the base line and the irregular curve, and means for recording each rotation of said rotatable member.

5. In a device of the type described, as a subcombination, means for representing area, said means comprising a traveling strip, means for forming a base line on said strip, a shiftable member having a writing implement normally engaging said strip at the base line, means for shifting said member to form an irregular curve, a rotatable member, means to cause said member to rotate at a speed varying directly with the product of the speed of the paper and the distance between the base line and the irregular curve, means for recording each rotation of said rotatable member, a counter and means for operating said counter upon each rotation of said rotatable member.

6. In a device of the type described, as a subcombination, means for representing area, said means comprising a traveling strip, means for forming a base line on said strip, a shiftable member having a writing implement normally engaging said strip at the base line, means for shifting said member to form an irregular curve, a rotatable member, means to cause said member to rotate at a speed varying directly with the product of the speed of the paper and the distance between the base line and the irregular curve, means for recording each rotation of said rotatable member, a counter, means for operating said counter upon each rotation of said rotatable member, and means for recording spaced intervals of time upon said strip.

7. In a device of the type described as a subcombination, a disc, a spring pressed yoke arranged above said disc, a friction wheel rotatably supported by said yoke and normally engaging said disc centrally thereof, a pressure indicator having an operating arm, means connecting said yoke, said operating arm to shift said yoke and means for recording each rotation of said friction wheel, embodying a traveling strip, a writing implement engaging said strip electrical means for operating said writing implement to shift the same having an open circuit, and means connected with said friction wheel to close said circuit at each rotation of said wheel.

8. In a device of the type described as a subcombination, a disc, a spring pressed yoke arranged above said disc, a friction wheel rotatably supported by said yoke and normally engaging said disc centrally thereof, means for regulating the pressure with which said wheel engages said disc, a pressure indicator having an operating arm, means connecting said yoke, said operating arm to shift said yoke and means for recording each rotation of said friction wheel, embodying a traveling strip, a writing implement engaging said strip, electrical means for operating said writing implement to shift the same having an open circuit, and means connected with said friction wheel to close said circuit at each rotation of said wheel.

9. In a device of the type described, as a subcombination, means for representing area, said means comprising a rotatable disc, a spring pressed yoke arranged above said disc, a friction wheel rotatably supported by said yoke and normally engaging said disc centrally thereof, a pressure indicator having an operating arm, means connecting said yoke and said operating arm to shift said yoke and means for recording each rotation of said friction wheel.

10. In a device of the type described as a subcombination disc, a spring pressed yoke arranged above said disc, a friction wheel rotatably supported by said yoke and normally engaging said disc centrally thereof, means for regulating the pressure with which said friction wheel engages said disc, a pressure indicator having an operating arm, means connecting said yoke and said operating arm to shift said yoke and means for recording each rotation of said friction wheel.

11. In apparatus for securing the horsepower of tractors and the like in hauling a given load, a paper strip, means for causing said strip to travel at a speed varying directly with the speed of the tractor, means for forming a base line upon said strip, means for forming a pressure curve of the tractor pull in pounds upon said strip, said curve having the base line for zero, and means for automatically computing the area between said pressure curve and said base line.

12. In apparatus for securing the horsepower of tractors and the like in hauling a given load, a paper strip, means for causing said strip to travel at a speed varying directly with the speed of the tractor, means for forming a base line upon said strip, means for forming a pressure curve of the tractor pull in pounds upon said strip, said curve having the base line for zero, means for computing the area between said pressure curve and said base line, means for forming a record upon said sheet of each completion of a predetermined area unit.

13. In apparatus for securing the horsepower of tractors and the like in hauling a given load, a paper strip, means for causing said strip to travel at a speed varying directly with the speed of the tractor, means for forming a base line upon said strip, means for forming a pressure curve of the tractor pull in pounds upon said strip, said curve having the base line for zero, means for automatically computing the area between said pressure curve and said base line, means for forming a record upon said sheet of each completion of a predetermined area unit, and means for operating a counter upon each completion of a unit.

14. In apparatus for securing the horsepower of tractors and the like in hauling a given load, a paper strip, means for causing said strip to travel at a speed varying directly with the speed of the tractor, a cylinder disposed between the tractor and the load, a fluid within the cylinder receiving the force of the pull exerted by the tractor, an indicator, a conduit connecting said indicator and said cylinder, means for forming a base line upon said strip, an arm bearing a writing implement, said writing implement normally engaging said strip at the base line formed thereon, means connecting said indicator and said arm for actuating said arm to form a pressure curve corresponding to the tractor pull in pounds upon said strip, and means for computing the area between said base line and said pressure curve.

15. In apparatus for securing the horsepower of tractors and the like in hauling a given load, a paper strip, means for causing said strip to travel at a speed varying directly with the speed of the tractor, a cylinder disposed between the tractor and the load, a fluid within the cylinder receiving the force of the pull exerted by the tractor, an indicator, a conduit connecting said indicator and said cylinder, means for forming a base line upon said strip, an arm bearing a writing implement, said writing implement normally engaging said strip at the base line formed thereon, means connecting said indicator and said arm for actuating said arm to form a pressure curve corresponding to the tractor pull in pounds upon said strip, means for computing the area between said base line and said pressure curve, a counter, and means for advancing said counter one step upon each completion of a predetermined area unit.

16. In apparatus for securing the horsepower of tractors and the like in hauling a given load, a paper strip, means for causing said strip to travel at a speed varying directly with the speed of the tractor, a cylinder disposed between the tractor and the load, a fluid within the cylinder receiving the force of the pull exerted by the tractor, an indicator, a conduit connecting said indicator and the said cylinder, means for forming a base line upon said strip, an arm bearing a writing implement, said writing implement normally engaging said strip at the base line formed thereon, means connecting said indicator and said arm for actuating said arm to form a pressure curve corresponding to the tractor pull in pounds upon said strip and means for computing the area between said base line and said pressure curve, and forming a record upon said strip at each completion of a predetermined area unit.

17. In apparatus for securing the horsepower of tractors and the like in hauling a given load, a paper strip, means for causing said strip to travel at a speed varying directly with the speed of the tractor, a cylinder disposed between the tractor and the load, a fluid within the cylinder receiving the force of the pull exerted by the tractor, an indicator, a conduit connecting said indicator and the said cylinder, means for forming a base line upon said strip, an arm bearing a writing implement, said writing implement normally engaging said strip at the base line formed thereon, means connecting said indicator and said arm for actuating said arm to form a pressure curve corresponding to the tractor pull in pounds upon said strip and means for computing the area between said base line and said pressure curve, forming a record upon said strip at each completion of a predetermined area unit, a counter and means for advancing said counter one step upon each completion of said area unit.

18. The herein described method of obtaining the area between a base line and an irregular curve having the base line as zero, comprising producing a line having indications thereon at irregular intervals, and regulating the proportion of such indications in proportion to the distance between said base line and said irregular curve.

In testimony whereof I affix my signature in presence of two witnesses.

ELLIS M. BURR.

Witnesses:
H. A. GAULT,
L. R. HUBBARD.